(12) United States Patent
Zeevi

(10) Patent No.: US 8,359,793 B2
(45) Date of Patent: Jan. 29, 2013

(54) EARTHQUAKE FORCE ABSORPTION SYSTEM

(76) Inventor: Danny Chagai Zeevi, Chatsworth, CA (US)

(*) Notice: Subject to any disclaimer, the term of this patent is extended or adjusted under 35 U.S.C. 154(b) by 0 days.

(21) Appl. No.: 13/197,250

(22) Filed: Aug. 3, 2011

(65) Prior Publication Data

US 2012/0047822 A1 Mar. 1, 2012

Related U.S. Application Data

(60) Provisional application No. 61/377,225, filed on Aug. 26, 2010.

(51) Int. Cl.
*E04B 1/98* (2006.01)
*E04H 9/02* (2006.01)

(52) U.S. Cl. ........ 52/167.8; 52/167.4; 52/294; 267/136; 248/618; 248/636

(58) Field of Classification Search ........... 52/167.1, 52/167.4, 167.7, 167.8, 167.9, 293.1, 294, 52/296; 248/576, 618, 636; 267/136, 140.11, 267/140.5
See application file for complete search history.

(56) References Cited

U.S. PATENT DOCUMENTS

| | | | | |
|---|---|---|---|---|
| 2,055,000 A * | 9/1936 | Bacigalupo | ............... | 52/167.6 |
| 2,597,800 A * | 5/1952 | Hussman | .................. | 248/565 |
| 3,748,800 A * | 7/1973 | Glicksberg | ............... | 52/167.4 |
| 4,517,778 A * | 5/1985 | Nicolai | .................... | 52/167.5 |
| 4,554,767 A * | 11/1985 | Ikonomou | ............... | 52/167.9 |
| 4,574,540 A * | 3/1986 | Shiau | ...................... | 52/167.8 |
| 4,766,708 A * | 8/1988 | Sing | ......................... | 52/167.8 |
| 5,303,524 A * | 4/1994 | Caspe | ..................... | 52/167.2 |
| 5,584,151 A | 12/1996 | Abou-Rached | | |
| 5,595,371 A * | 1/1997 | Hukuda et al. | ............ | 267/34 |
| 5,657,597 A * | 8/1997 | Loftus | ........................ | 52/274 |
| 5,732,519 A | 3/1998 | Leek | | |
| 6,003,280 A | 12/1999 | Wells | | |
| 6,324,795 B1 * | 12/2001 | Stiles et al. | ............. | 52/167.4 |
| 6,339,903 B1 | 1/2002 | Mitsuhayashi | | |
| 6,662,517 B1 | 12/2003 | Thompson | | |
| 6,763,634 B1 | 7/2004 | Thompson | | |
| 6,840,016 B1 | 1/2005 | Mualla | | |
| 6,925,772 B1 | 8/2005 | Iwakawa | | |
| 7,134,252 B2 | 11/2006 | Thompson | | |
| 7,231,743 B2 | 6/2007 | Takeuchi | | |
| 7,243,466 B2 * | 7/2007 | Bloch-Fortea | .......... | 52/167.1 |
| 2003/0024174 A1 | 2/2003 | Bonds | | |
| 2003/0213194 A1 | 11/2003 | Kawai | | |
| 2005/0120650 A1 | 6/2005 | Teramura et al. | | |
| 2006/0137264 A1 * | 6/2006 | Shizuku et al. | ......... | 52/167.7 |
| 2007/0028531 A1 | 2/2007 | Woodcock | | |
| 2008/0098670 A1 * | 5/2008 | Hsu | ......................... | 52/167.1 |
| 2009/0013619 A1 | 1/2009 | Marroquin | | |
| 2010/0005754 A1 * | 1/2010 | Weber | ..................... | 52/741.3 |
| 2010/0043316 A1 | 2/2010 | Takahashi | | |

FOREIGN PATENT DOCUMENTS

JP 63180740 A * 7/1988
JP 02058648 A * 2/1990

* cited by examiner

*Primary Examiner* — Brian Glessner
*Assistant Examiner* — Adriana Figueroa

(57) ABSTRACT

A system installed in building foundations to absorb forces from earthquakes. The earthquake force absorption system includes a footing structure extending into a foundation hole, an anchoring substrate lining a bottom of the foundation hole, opposing springs disposed around the footing structure, and attachment plates coupling the springs to the footing structure and the anchoring substrate.

5 Claims, 3 Drawing Sheets

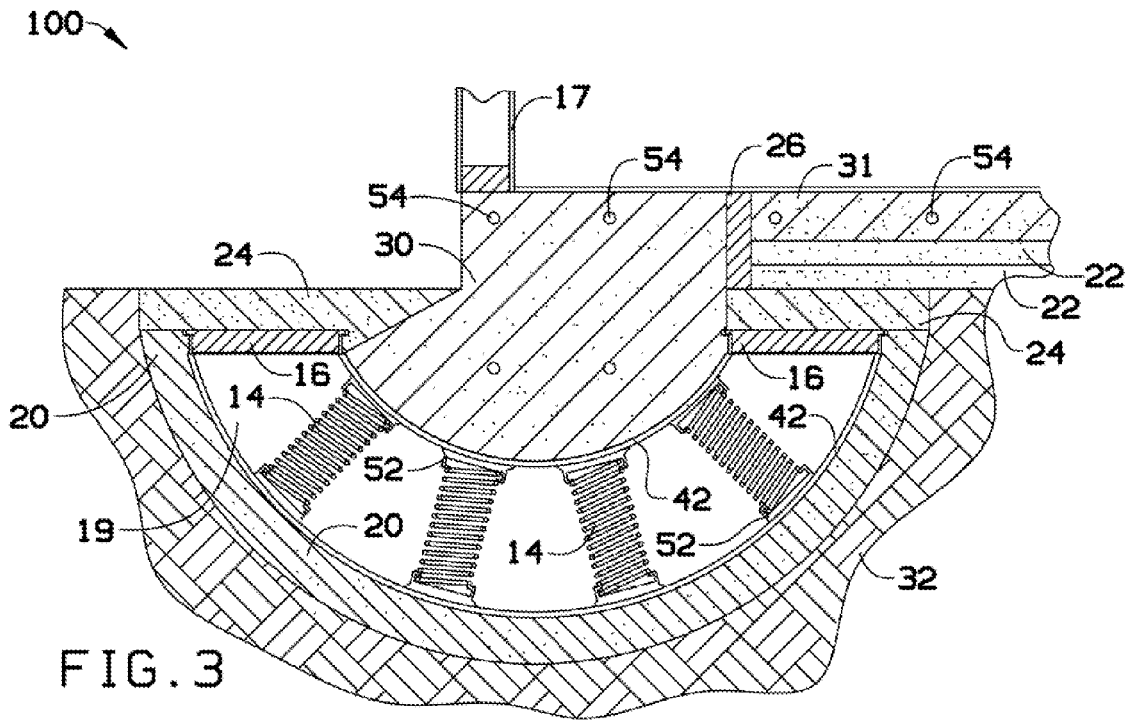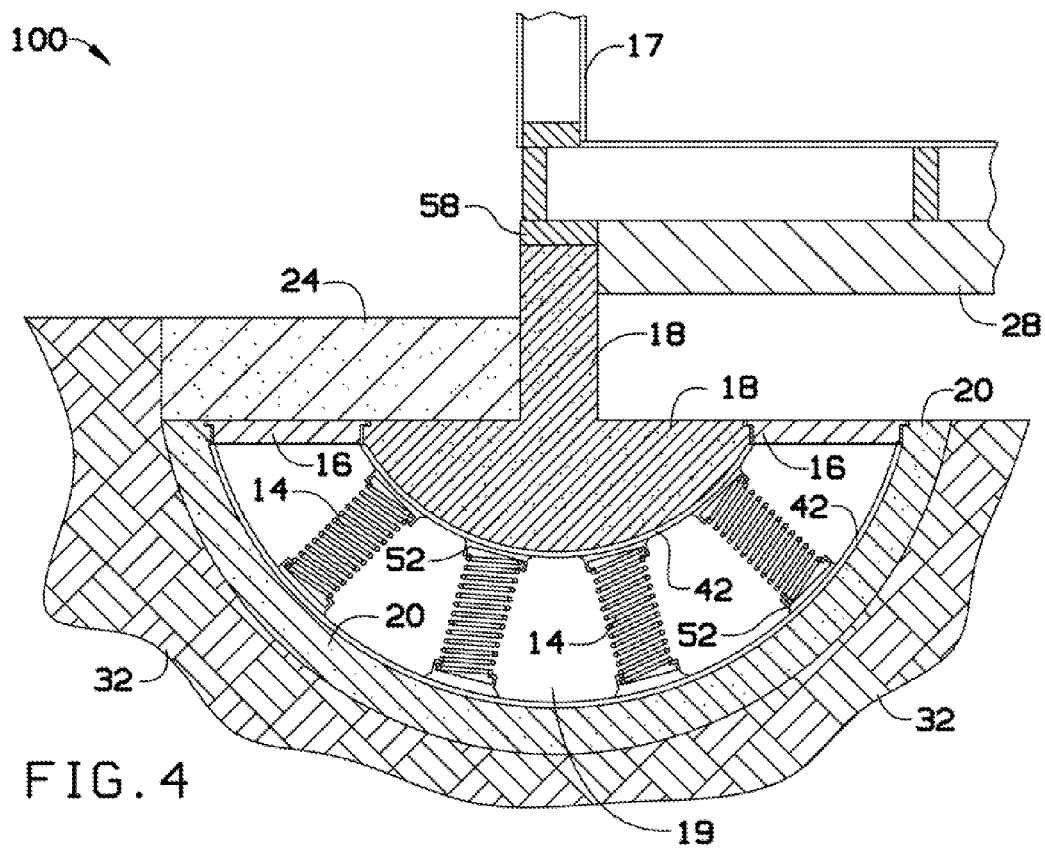

US 8,359,793 B2

EARTHQUAKE FORCE ABSORPTION SYSTEM

CROSS-REFERENCE TO RELATED APPLICATIONS

This application claims the benefit of priority to U.S. Provisional Application No. 61/377,225 filed Aug. 26, 2010, the contents of which are incorporated herein by reference.

BACKGROUND OF THE INVENTION

The present invention generally relates to a support system for a building. More particularly, the present invention relates to a force absorption support system for protecting the building or other structures from earthquake ground forces.

Buildings are designed to sustain some vertical and horizontal forces from the weight of the actual building, including its content and regular mobile forces. The forces are supported by a foundation. Unfortunately, traditional building construction methods have some deficiencies in preserving the structural integrity of the buildings in opposing vertical and lateral forces of an earthquake.

As can be seen, there is a need for a system that can absorb vertical lateral forces of an earthquake, keeping the structural integrity of the building.

SUMMARY OF THE INVENTION

In one aspect of the present invention, an earthquake force absorption system includes a footing structure extending into a foundation hole, an anchoring substrate lining a bottom of the foundation hole, opposing springs disposed around the footing structure, and attachment plates coupling the springs to the footing structure and the anchoring substrate.

In another embodiment of the present invention, an earthquake force absorption system including a footing structure extending into a foundation hole, an anchoring substrate lining a bottom of the foundation hole, opposing springs disposed around the footing structure, curved plates coupling the springs to the footing structure and the anchoring substrate, and the springs are semi-circularly disposed around the footing structure.

These and other features, aspects and advantages of the present invention will become better understood with reference to the following drawings, description and claims.

BRIEF DESCRIPTION OF THE DRAWINGS

FIG. 3 illustrates a cross-sectional view of the earthquake force absorption system according to another embodiment of the present invention showing the system being used on a newly formed foundation;

FIG. 4 illustrates a cross-sectional view of the earthquake force absorption system of FIG. 3 being used with a newly formed foundation including a raised floor footing;

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features.

Broadly, embodiments of the present invention generally provide a system installed in building foundations to absorb forces from earthquakes. The force absorption system of the present invention may be placed under new foundations or existing foundations. Aspects of the disclosed system may be conducive to dampening vertical and lateral forces from an earthquake.

The present invention is being described in conjunction with different types of foundations. The foundations are not part of the present invention and may be of any material.

Figure 1:
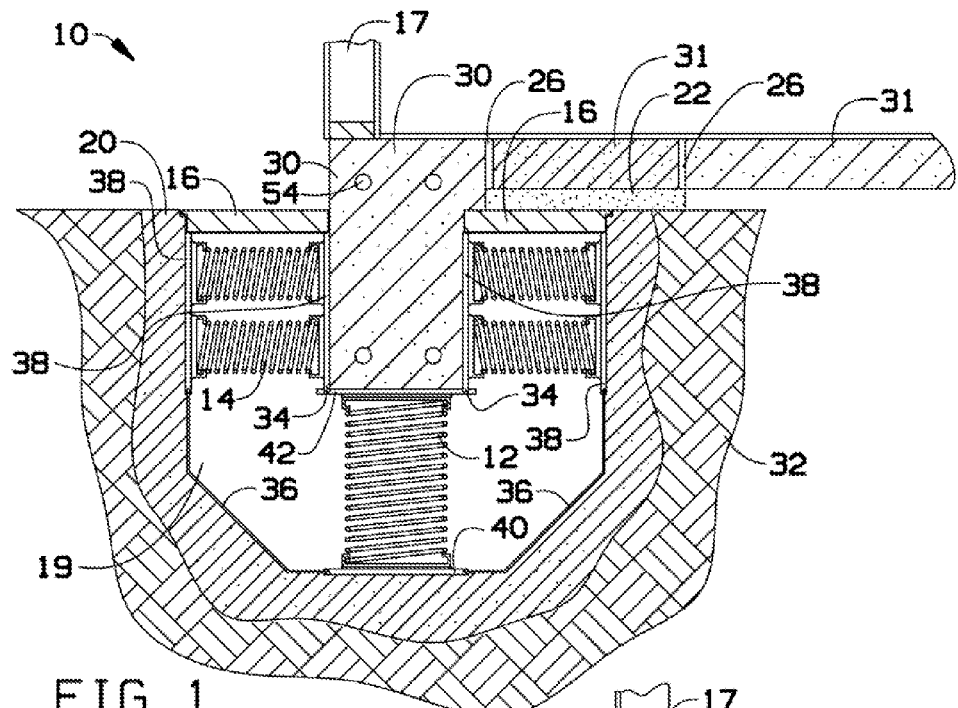
FIG. 1 illustrates a cross-sectional view of an earthquake force absorption system according to an exemplary embodiment of the present invention showing the system being used on an existing foundation with a slab floor.

FIG. 1 shows an earthquake force absorption system 10 according to an exemplary embodiment of the present invention. The system 10 may include a footing structure 30 extending into a foundation hole 19, an anchoring substrate 20 lining a bottom of the foundation hole 19, opposing springs 14 disposed around the footing structure 30, and attachment plates 38 coupling the springs 14 to the footing structure 30 and the anchoring substrate 20. The springs 14 may be disposed in opposition to one another around the footing structure 30 to provide a dampening of lateral movement to a building 17 attached to the footing structure 30 during an earthquake. In this embodiment the springs 14 may be orthogonally disposed between the attachments plates 38, for example, on a plane approximately horizontal to a base plate 40 of the substrate 20. Vertical springs may dampen vertical forces.

The attachment plates 38 may be made of a high strength material. In some embodiments, the attachment plates 38 may be made of steel. The size of the attachment plates 38 may depend on the size of the footing structure 30 and the seismic loads of the building 17. The thickness of the attachment plates 38 may depend on the seismic loads of the building 17. In some embodiments, the thickness of the attachment plates 38 may be ⅜ of an inch.

The attachment plates 38 may be attached to the anchoring substrate 20 and the footing structure by using commercially available cement, adhesive, epoxy, welding, or fastener.

Figure 5:
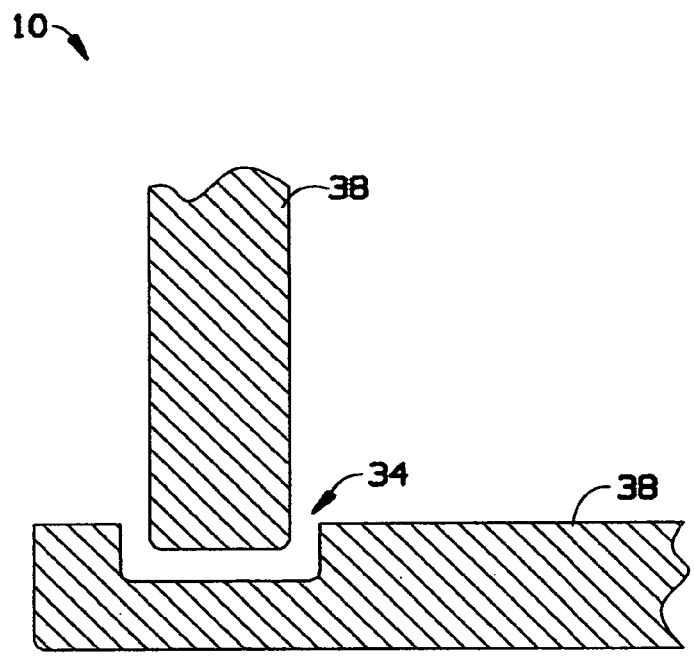
FIG. 5 illustrates a detailed view of a coupling system for the earthquake force absorption system plates of FIG. 1.

FIG. 5 shows that the attachment plates 38 may be connected to each other at right angles by a coupling system 34. The coupling system 34 may be any commercially available coupling system that may allow to quickly connect at right angles two attachment plates 38. For example, the coupling system 34 may be a tongue and groove coupling system. Having the attachment plates 38 connected at a right angle may help to resist lateral displacement of the attachment plates 38 during the earthquake and may resist from external elements The size and tensioning of the springs 14 may depend on the size of the footing structure 30 and the seismic loads of the building 17. In some embodiments, the springs 14 may be a 4088 spring made by Century Spring.

A middle spring 12 may be placed vertically between the footing structure 30 and a base plate 40, (sometimes referred to as a middle plate 40) secured to the anchoring substrate 20. The middle spring 12 may help in supporting the vertical movement of the building 17 attached to the footing structure 30 during an earthquake. The tensioning of the middle spring 12 may depend on the size of the footing structure 30 and the seismic loads of the building 17. In some embodiments, the middle spring 12 may be a 4024 A spring made by Century Spring. The middle plate 40 may serve as an anchoring base for the middle spring 12. The middle plate 40 may be made of the same material as the attachment plates 38.

Support plates 36 may be an anchor point between the attachment plates 38 placed around the anchoring substrate 20. The support plates 36 may have one end coupled to one of the attachment plates 38 and the other end attached to the next attachment plate 38. The support plates 36 may depend on the seismic loads of the building 17. In some embodiments, the thickness of the support plates 36 may be $1/16$ to $3/32$ inches. The support plates 36 may be made of the same material as the material of the attachment plates 38.

In one exemplary environment, the system 100 may be used on a newly formed foundation hole 19. For a newly formed foundation hole 19, usually soil 32 may be dug out to create the foundation hole 19 on which a footing structure 30 may be placed. The footing structure 30 may extend substantially vertically into the foundation hole 19. Reinforcement bars 54 are usually added to the footing structure 30 to increase the structural integrity of the exterior concrete. The reinforcement bars 54 may be encased within concrete along the exterior of the unit layer of porous material 22 is usually placed before pouring concrete for the slabs 31. Expansion joints 26 are usually created to allow for lateral movement between the slabs and floor 31. The expansion joints 26 may usually be filled with an expansive material to waterproof the joints.

Caps 16 may be placed to cover the exposed top portion of the foundation hole 19. Caps 16 may prevent the entrance of water inside the foundation hole 19. The caps 16 may be made of rubber.

The system 10 may be encased inside the foundation hole 19 between the footing structure 30 and the anchoring substrate placed around the perimeter of the soil 32.

Figure 2:
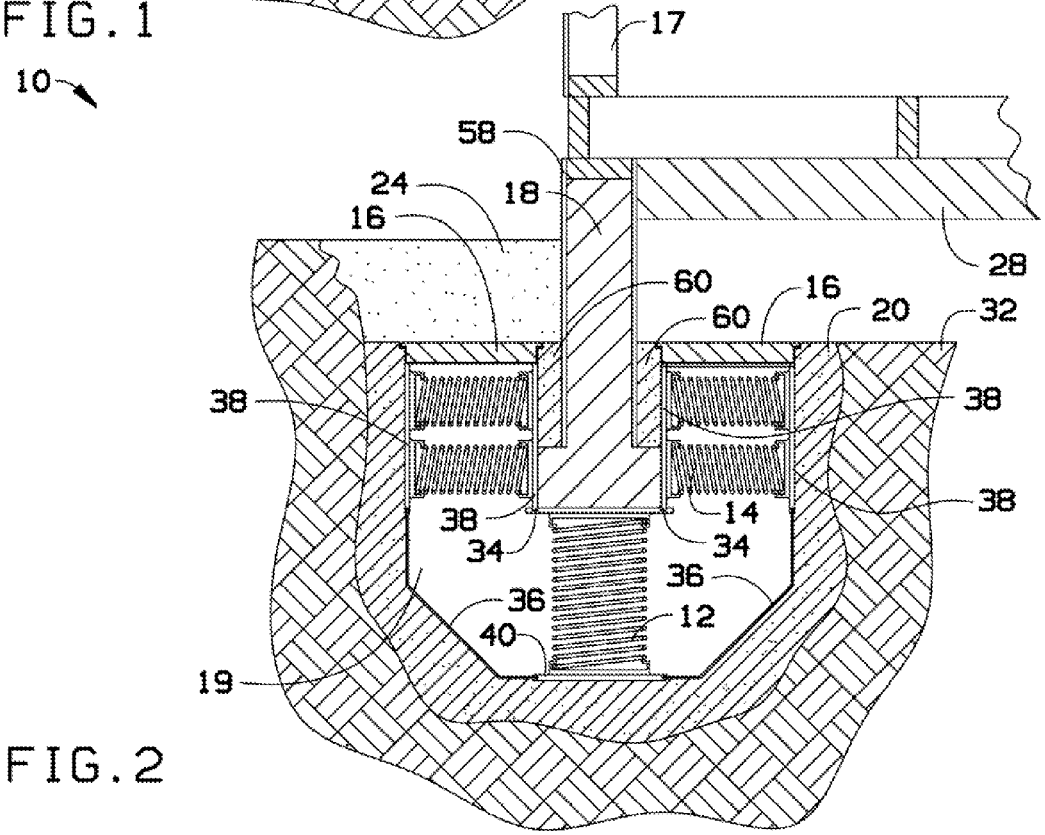
FIG. 2 illustrates a cross-sectional view of the earthquake force absorption system of FIG. 1 being used with an existing foundation including raised floor footing.

FIG. 2 shows the system 10 being used with a pre-existing foundation hole 19. The system 10 may include a raised footing structure 18 extending into the foundation hole 19. A girder 28 may be connected to an upper section of the raised footing structure 18. A steel plate 58 may be placed to strengthen the pre-existing footing structure 18. A layer of dirt 24 may cover the entrance of the hole 19. Spaces 60 between the raised footing structure 18 and the attachment plates 38 may be filled with slurry. The anchoring substrate 20 may be placed lining the bottom of the foundation hole 19. Opposing springs 14 may be disposed around the raised footing structure 18 and attachment plates 38 coupling the springs 14 to the raised footing structure 18 and the anchoring substrate 20. The springs 14 may be disposed in opposition to one another around the raised footing structure 18 to provide a dampening of lateral movement to a building 17 attached to the raised footing structure 18 during an earthquake. The middle spring 12 may also provide a dampening of vertical movement and opposes the own weight of the building 17 and gravity.

FIG. 3 shows an earthquake force absorption system 100 according to another exemplary embodiment of the present invention. The system 100 may be used on a newly formed foundation. In the newly formed foundation, usually the slab 31 is cut adjacent to the footing structure 30. The external surface of the footing structure 30 may be smoothed out to accommodate the force absorption system 100. The system 100 may include a footing structure 30 extending into a foundation hole 19, an anchoring substrate 20 lining the bottom of the foundation hole 19, opposing springs 14 disposed around the footing structure 30, and curved plates 42 coupling the springs 14 to the footing structure 30 and the anchoring substrate 20. The springs 14 may be semi-circularly disposed around the footing structure 30 to provide a dampening of lateral and vertical movement to a building (not shown) attached to the footing structure 30 during an earthquake. For example, springs 14 on the right side of a centerline may push against the footing as lateral forces push the building 17 to the right, while springs on the left side of the centerline pull back on the building 17. Thus springs 14 on one side of the centerline may complement a force extended by springs to the left of the centerline. Additionally, all springs 14 may contribute toward dampening vertical forces exerted on the building 17 while simultaneously dampening the lateral forces.

FIG. 4 is similar to FIG. 3 except that the system 100 is being used with a newly formed raised foundation. The system 100 may include a raised footing structure 18 extending into the foundation hole 19. A girder 28 may be connected to an upper section of the raised footing structure 18. A layer of dirty 24 may cover the entrance of the hole 19. Spaces 60 between the raised footing structure 18 and the attachment plates 38 may be filled with slurry. The anchoring substrate 20 may be placed lining the bottom of the foundation hole 19.

Figure 6:
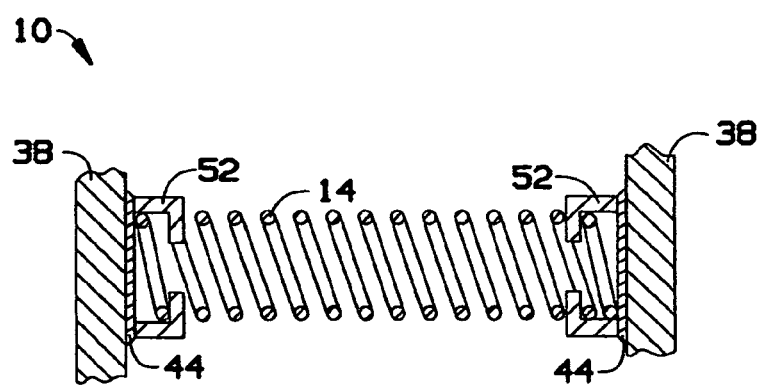
FIG. 6 illustrates a detailed view of a connection between the spring and two plates of the earthquake force absorption system of FIG. 1.

FIG. 6 shows an enlarged view of a connection between a spring 14 and attachment plates 38. The springs may be connected to the attachment plates 38 by using a commercially available securing system 52. In some embodiments, the securing system 52 may be clips, clamps, steel channels, hooks, or a device that may fix the spring 14 to the attachment plates 38. The securing system 52 may be attached to the attachment plates 38 by welding 44.

The springs 14, the attachment plates 38, the curved plates 42, and the support plates 36 may include a protective coating. The protective coating may be a rubber coating.

The systems 10 and 100 may be used on any application that has a need to absorb quick and powerful acceleration. The systems 10 and 100 may be used in areas above permafrost, where the topsoil may be on the move for months out of the year.

It should be understood, of course, that the foregoing relates to exemplary embodiments of the invention and that modifications may be made without departing from the spirit and scope of the invention as set forth in the following claims.

What is claimed is:

1. An earthquake force absorption system comprising:
   a footing structure extending into a foundation hole;
   an anchoring substrate lining a bottom of the foundation hole and spaced from the footing structure creating a space between said anchoring substrate and said footing structure;
   a plurality of springs disposed around the footing structure in said space;
   wherein each one of the plurality of springs are disposed between a pair of attachment plates, one attachment plate of the pair being attached to the footing structure and the other attachment plate of the pair being attached to the anchoring substrate to couple the springs to the footing structure and the anchoring substrate;
   wherein the springs are orthogonally disposed between the attachments plates;

wherein the attachment plates that are connected to the footing structure are connected to each other at right angles by a coupling system;
the coupling system comprising a tongue and groove coupling system and
further comprising support plates placed on the anchoring substrate, the support plates are disposed between the attachment plates that are attached to the anchoring substrate, said support plates have both ends coupled to said attachment plates that are attached to the anchoring substrate.

2. The earthquake force absorption system according to claim 1, further comprising a middle spring placed vertically between the footing structure and a middle plate secured to the anchoring substrate.

3. The earthquake force absorption system according to claim 1, further comprising caps placed to cover exposed top portions of the foundation hole.

4. The earthquake force absorption system according to claim 1, further comprising a protective coating on the attachment plates and the springs.

5. The earthquake force absorption system according to claim 1, wherein the springs are connected to the attachment plates by using clips or clamps.

\* \* \* \* \*